United States Patent
Ahn et al.

(10) Patent No.: US 10,949,654 B2
(45) Date of Patent: Mar. 16, 2021

(54) TERMINAL AND SERVER FOR PROVIDING VIDEO CALL SERVICE

(71) Applicant: HYPERCONNECT, INC., Seoul (KR)

(72) Inventors: Sang Il Ahn, Chungcheongbuk-do (KR); Hee Min Choi, Seoul (KR)

(73) Assignee: HYPERCONNECT, INC., Seoul (KR)

(*) Notice: Subject to any disclaimer, the term of this patent is extended or adjusted under 35 U.S.C. 154(b) by 77 days.

(21) Appl. No.: 16/219,593

(22) Filed: Dec. 13, 2018

(65) Prior Publication Data

US 2019/0188459 A1 Jun. 20, 2019

(30) Foreign Application Priority Data

Dec. 15, 2017 (KR) .................. 10-2017-0173117

(51) Int. Cl.
  *G06K 9/00* (2006.01)
  *G06F 16/28* (2019.01)
  *G06F 3/0482* (2013.01)
  *G06F 3/0481* (2013.01)
  *H04M 1/725* (2021.01)

(52) U.S. Cl.
  CPC ....... *G06K 9/00315* (2013.01); *G06F 3/0482* (2013.01); *G06F 3/04817* (2013.01); *G06F 16/287* (2019.01); *G06K 9/00302* (2013.01); *H04M 1/72555* (2013.01); *H04M 2250/52* (2013.01); *H04M 2250/62* (2013.01)

(58) Field of Classification Search
  None
  See application file for complete search history.

(56) References Cited

U.S. PATENT DOCUMENTS

| | | | |
|---|---|---|---|
| 9,247,199 B2 | 1/2016 | Lee et al. | |
| 2008/0158334 A1* | 7/2008 | Reponen | G10L 15/26 348/14.02 |
| 2010/0134588 A1 | 6/2010 | Kim | |
| 2014/0207811 A1* | 7/2014 | Kim | G06F 16/24 707/758 |
| 2018/0249056 A1* | 8/2018 | Chi | H04N 5/232 |

FOREIGN PATENT DOCUMENTS

| | | | |
|---|---|---|---|
| KR | 10-2010-0062207 A | 6/2010 | |
| KR | 10-2011-0020131 A | 3/2011 | |
| KR | 10-2012-0018479 A | 3/2012 | |
| KR | 10-2013-0122300 A | 11/2013 | |
| KR | 10-2014-0057036 A | 5/2014 | |

* cited by examiner

*Primary Examiner* — Delomia L Gilliard
(74) *Attorney, Agent, or Firm* — Marshall, Gerstein & Borun LLP

(57) ABSTRACT

There is provided an application stored in a computer-readable storage medium for a first terminal to perform a method of providing a video call service, the method including: establishing a video call session between the first terminal of a first user and a second terminal of a second user; preparing facial expression information of the second user accumulated in at least one video call session executed by the second terminal before the video call session; determining emotion information corresponding to the facial expression information of the second user based on the facial expression information of the second user; and providing the determined emotion information through an execution screen of the first terminal.

15 Claims, 15 Drawing Sheets

TERMINAL AND SERVER FOR PROVIDING VIDEO CALL SERVICE

CROSS-REFERENCE TO RELATED APPLICATION

This application claims the benefit of Korean Patent Application No. 10-2017-0173117, filed on Dec. 15, 2017, in the Korean Intellectual Property Office, the disclosure of which is incorporated herein in its entirety by reference.

BACKGROUND

1. Field

One or more embodiments relate to a terminal and a server for providing a video call service using facial expression information of a user.

2. Description of the Related Art

With the development of science and technology, most people have their own terminals such as smartphones or tablet personal computers (PCs). Such terminals may take and play images/videos, and may communicate with other terminals to receive and transmit information from and to the other terminals or may support video calls.

There are various types of video call services based on video calls. For example, random video chat services are services for connecting a terminal of a user who requests a random video chat service to a terminal of a user randomly selected from among users who use the random video chat service.

SUMMARY

A terminal may provide emotion information corresponding to facial expression information of a counterpart of a video call. Since the emotion information corresponding to the facial expression information of the counterpart of the video call is provided, an awkward atmosphere between users may be dispelled and active communication between the users may be performed.

Also, when a video call session is established between terminals, a server may provide emotion information of the other user to each of the terminals.

Additional aspects will be set forth in part in the description which follows and, in part, will be apparent from the description, or may be learned by practice of the presented embodiments.

According to one or more embodiments, an application is stored in a computer-readable storage medium for a first terminal to perform a method of providing a video call service, the method including: establishing a video call session between the first terminal of a first user and a second terminal of a second user; preparing facial expression information of the second user accumulated in at least one video call session executed by the second terminal before the video call session; determining emotion information corresponding to the facial expression information of the second user based on the facial expression information of the second user; and providing the determined emotion information through an execution screen of the first terminal.

According to one or more embodiments, a server for providing a video call service includes: a communication interface configured to communicate with a plurality of terminals that support a video call; a storage; a processor; and a memory configured to store instructions executable by the processor, wherein the processor is configured to execute the instructions for receiving a video stream taken in a video call session executed by each of the plurality of terminals, from each of the plurality of terminals, obtaining facial expression information of a user of each of the plurality of terminals based on facial feature points of the user included in the received video stream, determining emotion information indicating an emotional state of the user corresponding to each of the plurality of terminals based on the facial expression information of the user corresponding to each of the plurality of terminals and storing the emotion information in the storage, checking whether a video call session is established between a first terminal of a first user and a second terminal of a second user, and transmitting, to the first terminal, emotion information of the second user accumulated in at least one video call session executed by the second terminal before the establishing of the video call session, stored in the storage.

According to one or more embodiments, a non-transitory computer-readable storage medium storing instructions executable by a processor includes: instructions for establishing a video call session between a first terminal of a first user and a second terminal of a second user; instructions for preparing facial expression information of the second user accumulated in at least one video call session executed by the second terminal before the video call session; instructions for determining emotion information corresponding to the facial expression information of the second user based on the facial expression information of the second user; and instructions for providing the determined emotion information through an execution screen of the first terminal.

BRIEF DESCRIPTION OF THE DRAWINGS

These and/or other aspects will become apparent and more readily appreciated from the following description of the embodiments, taken in conjunction with the accompanying drawings in which reference numerals denote structural elements and.

DETAILED DESCRIPTION

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail so as not to obscure the embodiments with unnecessary detail.

Throughout the specification, it will be understood that when an element is referred to as being "connected" to another element, it may be 'directly connected' to the other element or 'connected' to the other element with intervening elements therebetween. It will be further understood that when a part "includes" or "comprises" an element, unless otherwise defined, the part may further include other elements, not excluding the other elements.

It will be understood that although the terms 'first', 'second', etc. may be used herein to describe various elements, these elements should not be limited by these terms. These elements are only used to distinguish one element from another.

The present embodiments relate to a terminal and a server for providing a video call service, and what is well known to one of ordinary skill in the art is not described in detail.

Expressions such as "at least one of" when preceding a list of elements modify the entire list of elements and do not modify the individual elements of the list.

Figure 1:
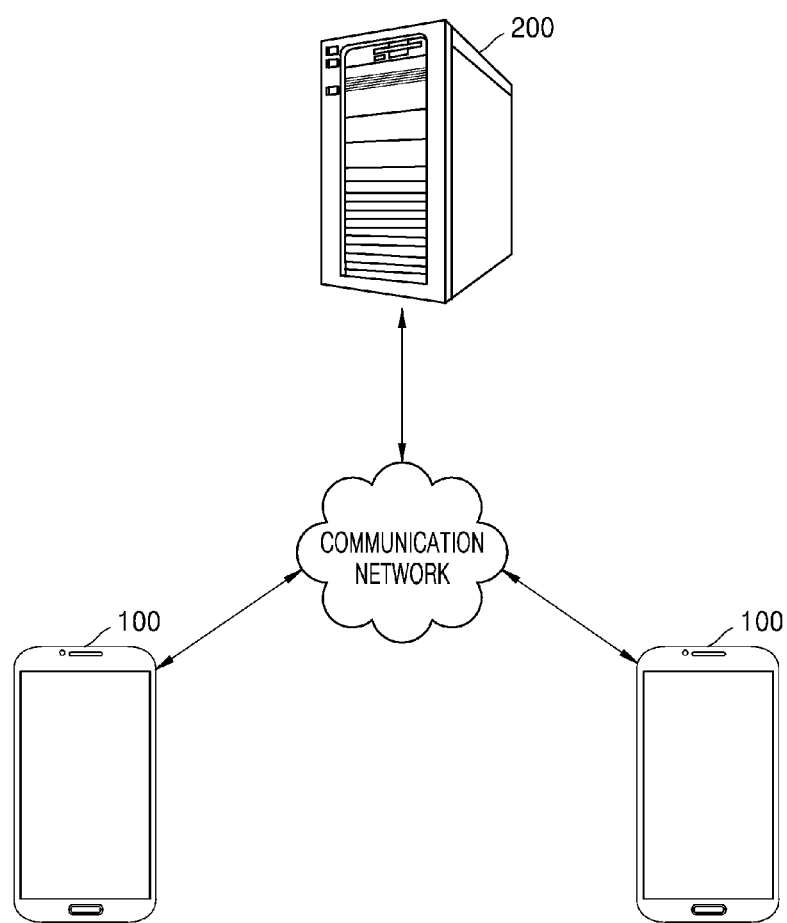
FIG. 1 is a diagram for describing an environment in which a video call service is provided.

FIG. 1 is a diagram for describing an environment in which a video call service is provided.

The term 'video call service' refers to a service by which each of a plurality of users may communicate with a counterpart by transmitting a video to the counterpart and receiving a video of the counterpart by using his/her terminal. Each user using a video call service may transmit/receive a video and a voice through his/her terminal and may transmit/receive text through a chat function. A user who is to use a video call service may use the video call service with the counterpart by directly designating the counterpart or designating the counterpart according to a random or predetermined method of a server that provides the video call service.

Referring to FIG. 1, a terminal 100 is connected to a server 200 that provides a video call service through a communication network. The server 200 may store various programs or applications and data helping each of a plurality of users to use the video call service by using his/her terminal 100. The server 200 that provides the video call service may perform both local communication and remote communication. The server 200 that provides the video call service may be connected to a plurality of the terminals 100 through the communication network. The terminal 100 may be any of various user terminals that may be connected to the server 200 that provides the video call service. Examples of the terminal 100 that is a device for communicating with the server 200 that provides the video call service may include a wearable device such as a smart watch, a mobile device such as a smartphone, a tablet personal computer (PC), or a laptop computer, and a stationary device such as a desktop computer. Also, the terminal 100 may be a video call device for taking and playing a video so that a video call is made between users connected through the video call service.

Figure 2:
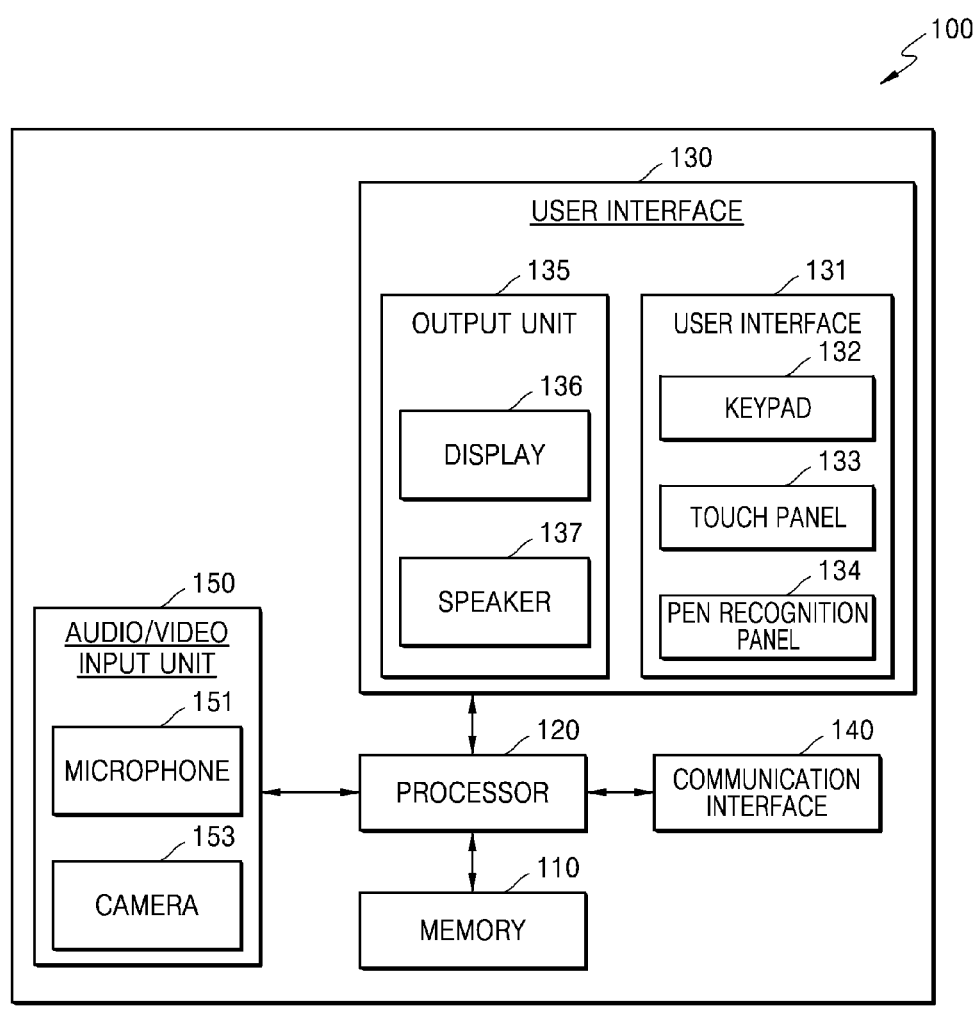
FIG. 2 is a block diagram illustrating a configuration of a terminal according to an embodiment.

FIG. 2 is a block diagram illustrating a configuration of the terminal 100 according to an embodiment.

Referring to FIG. 2, the terminal 100 may include a memory 110, a processor 120, a user interface 130, a communication interface 140, and an audio/video input unit 150. It will be understood by one of ordinary skill in the art that the terminal 100 may further include general-purpose elements other than the elements illustrated in FIG. 2.

The memory 110 may store software or programs. For example, the memory 110 may store programs such as applications or application programming interfaces (APIs) and various kinds of data. The memory 110 may store instructions executable by the processor 120.

The processor 120 may execute the instructions stored in the memory 110. The processor 120 may use various programs, content, and data stored in the memory 110, or may store new programs, content, and data in the memory 110.

The processor 120 may access the memory 110 and may perform booting by using an operating system (OS) stored in the memory 110. The processor 120 may perform various operations by using the various programs, content, and data stored in the memory 110. For example, the processor 120 may display a predetermined screen on a display 136 by using the various programs, content, and data stored in the memory 110. When a user's manipulation is performed on a portion of the display 136, the processor 120 may perform a control operation corresponding to the user's manipulation.

The processor 120 may include a graphics processing unit (GPU) specialized for graphics processing. When booting of the terminal 100 is completed, the GPU displays a user interface screen on a portion of the display 136. In detail, the GPU may generate a screen displaying a video call layout including various objects such as content, an icon, and a menu. The GPU may calculate attribute values such as coordinates at which each object will be displayed, a shape, a size, or a color according to the video call layout of the screen. The GPU may generate a screen of various layouts including the object based on the calculated attribute values. The screen generated by the GPU may be provided to the display 136 and may be displayed on each portion of the display 136.

The processor 120 may include a video processor and an audio processor. The processor 120 may control the video processor and the audio processor to respectively process video data and audio data included in a video stream received through the communication interface 140 or a video stream stored in the memory 110.

The user interface 130 may include an input unit 131 and an output unit 135.

The input unit 131 may receive various instructions from the user. The input unit 131 may include at least one of a keypad 132, a touch panel 133, and a pen recognition panel 134.

The keypad 132 may include various types of keys such as mechanical buttons and wheels formed on various portions such as a front portion, a side portion, and a rear portion of an outer surface of a main body of the terminal 100.

The touch panel 133 may detect the user's touch input and may output a touch event value corresponding to a detected touch signal. When the touch panel 133 is combined with a display panel to form a touch screen, the touch screen may be implemented as any of various touch sensors such as a capacitive sensor, a resistive sensor, or a piezoelectric sensor.

The pen recognition panel 134 may detect a proximity input or a touch input of a touch pen (e.g., a stylus pen) according to the user's operation of the touch pen and may output a detected pen proximity event or a detected pen touch event. The pen recognition panel 134 may use, for example, an electromagnetic radiation (EMR) method and may detect a touch input or a proximity input according to a change in an intensity of an electromagnetic field when the touch pen approaches or touches. The pen recognition panel 134 may include an electromagnetic induction coil sensor having a grid structure and an electromagnetic signal processor for sequentially applying alternating current signals having a predetermined frequency to loop coils of the electromagnetic induction coil sensor.

The output unit 135 may include the display 136 and a speaker 137.

The display 136 may include a display panel and a controller for controlling the display panel. The display panel may include any of various panels such as a liquid crystal display (LCD) panel, an organic light-emitting diode (OLED) display panel, an active-matrix organic light-emitting diode (AM-OLED) display panel, or a plasma display panel (PDP). The display panel may be flexible or wearable. The display 136 may be combined with the touch panel 133 of the input unit 131 and may be provided as a touch screen.

The speaker 137 may output a sound based on audio data. For example, the speaker 137 may output the user's voice according to audio data included in a video stream.

The communication interface 140 may communicate with any of various external devices according to various communication methods. The communication interface 140 may include at least one of a Wi-Fi chip, a Bluetooth chip, a near-field communication (NFC) chip, and a wireless communication chip. The processor 120 may communicate with various external devices via the communication interface 140.

The Wi-Fi chip and the Bluetooth chip may respectively perform communication by using a Wi-Fi method and a Bluetooth method. When the Wi-Fi chip or the Bluetooth chip is used, various kinds of connection information such as a service set identifier (SSID) and a session key may be transmitted/received first, communication may be established by using the various kinds of connection information, and then various kinds of information may be transmitted/received. The NFC chip refers to a chip that operates by using an NFC method using a frequency band of 13.56 MHz from among various radio frequency identification (RFID) frequency bands. The wireless communication chip refers to a chip that performs communication according to various communication standards such as Institute of Electrical and Electronics Engineers (IEEE), Zigbee, Third Generation (3G), Third Generation Partnership Project (3GPP), Long Term Evolution (LTE), and Fifth Generation (5G).

The audio/video input unit 150 may include a microphone 151 and a camera 153. The microphone 151 may receive the user's voice or another sound and may convert the user's voice or the other sound into audio data. The processor 120 may use the user's voice input through the microphone 151 in a video call, or may convert the user's voice into audio data and may store the audio data in the memory 110. The camera 153 may capture a still image or a moving image under the user's control. The camera 153 may be a camera module located on a front surface or a rear surface of the terminal 100. The processor 120 may generate a video stream for a video call by using a video taken by the camera 153 and a voice input through the microphone 151.

The terminal 100 may operate in a motion control mode or a voice control mode. When the terminal 100 operates in the motion control mode, the processor 120 may capture an image of the user by activating the camera 153, may track a change in the user's motion, and may perform a control operation corresponding to the change. When the terminal 100 operates in the voice control mode, the processor 120 may analyze the user's voice input through the microphone 151 and may perform a control operation according to the analyzed user's voice.

The names of elements of the terminal 100 may be changed. Also, the terminal 100 according to the present disclosure may include at least one of the elements, may not include some of the elements, or may further include other additional elements. The terminal 100 may operate as follows by using at least one of the elements.

Figure 3:
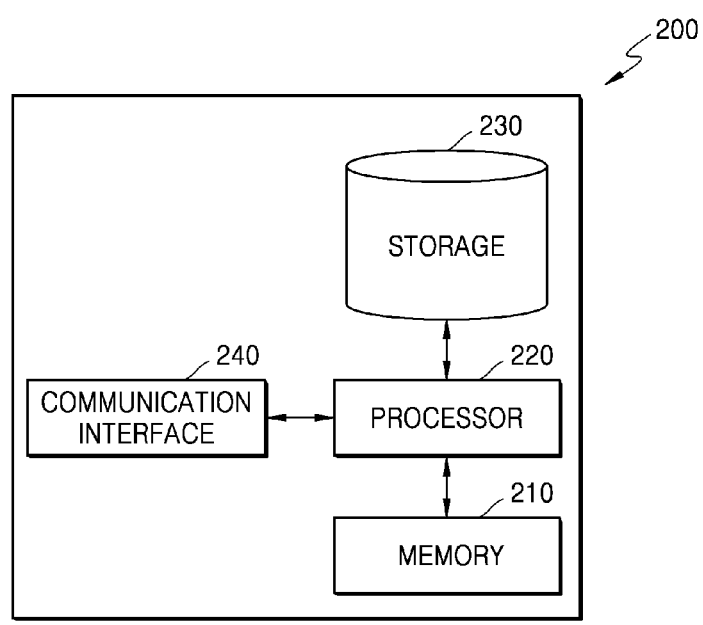
FIG. 3 is a block diagram illustrating a configuration of a server for providing a video call service, according to an embodiment.

FIG. 3 is a block diagram illustrating a configuration of the server 200 for providing a video call service, according to an embodiment.

Referring to FIG. 3, the server 200 that provides a video call service includes a memory 210, a processor 220, a storage 230, and a communication interface 240. It will be understood by one of ordinary skill in the art that the server 200 may further include general-purpose elements other than the elements illustrated in FIG. 3. Each element shown in FIG. 3 may be separated, added, or omitted according to a method of implementing the server 200 that provides the video call service. That is, one element may be divided into two or more elements, two or more elements may be combined into one element, or some elements may be further added or removed, according to the implementation method.

The memory 210 may store instructions executable by the processor 220. The memory 210 may store software or programs.

The processor 220 may execute the instructions stored in the memory 210. The processor 220 may control an overall operation of the server 200 that provides the video call service. The processor 220 may obtain information and a request received through the communication interface 240 and may store the received information in the storage 230. Also, the processor 220 may process the received information. For example, the processor 220 may generate information used for the video call service from the information received from the terminal 100, or may process the received information for management and may store the processed information in the storage 230. Also, the processor 220 may transmit information for providing the video call service to the terminal 100 through the communication interface 240 by using the information stored in the storage 230 in response to the request obtained from the terminal 100.

The storage 230 may store various kinds of software and information needed for the server 200 to provide the video call service. For example, the storage 230 may store programs and applications executed by the server 200 that provides the video call service and various kinds of data used in the video call service.

The storage 230 may store and manage personal information of video call service users in a database. The storage 230 may store various kinds of information used in the video call service and users' personal information by accounts used to access the server 200 that provides the video call service.

The communication interface 240 may communicate with external devices including the terminal 100. For example, the server 200 that provides the video call service may receive a video call service initiation request and a request for configuration information for setting a video call service environment from the terminal 100 and may provide all items related to the video call service in response to the request of the terminal 100.

Figure 4:
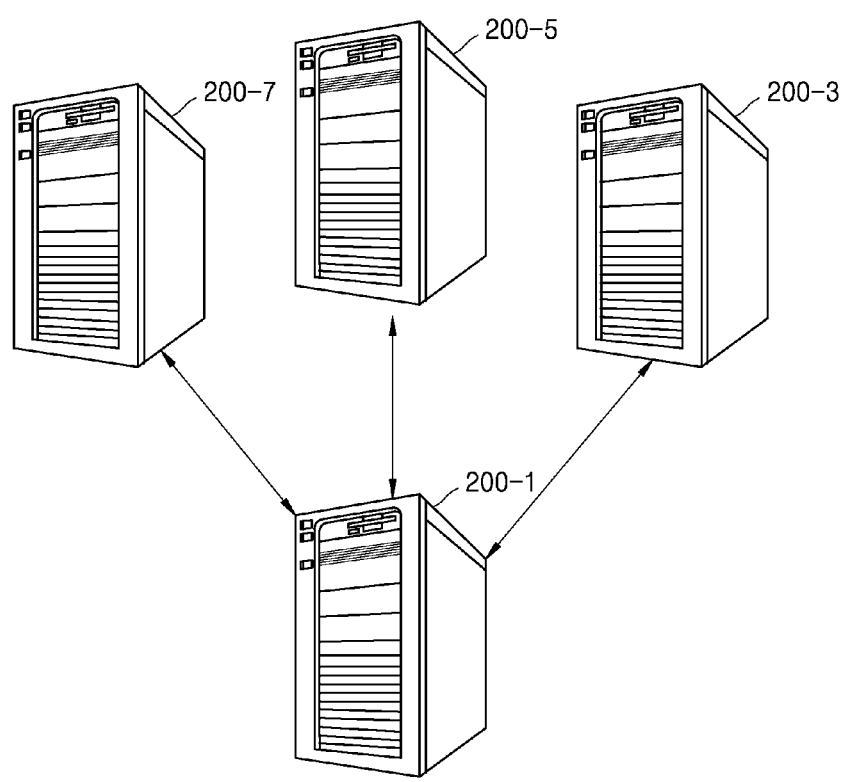
FIG. 4 is a diagram for describing an example where the server that provides a video call service includes a plurality of distributed servers, according to another embodiment.

FIG. 4 is a diagram for describing an example where the server 200 that provides a video call service includes a plurality of distributed servers, according to another embodiment. Although omitted, the description already made for the server 200 that provides the video call service may be applied below.

Referring to FIG. 4, the distributed servers that provide a video call service may include a load balancing server 200-1 and functional servers 200-3, 200-5, and 200-7 that provide the video call service. When there is a video call service request of an external device such as the terminal 100, the load balancing server 200-1 may determine any of the functional servers 200-3, 200-5, and 200-7 that provide the video call service and may connect the selected server to the terminal 100, or may monitor states of the functional servers 200-3, 200-5, and 200-7 that provide the video call service, may select an optimal server, and may connect the optimal server to the terminal 100.

Each of a first terminal 100-1 of FIGS. 5A through 9 and FIG. 11 and a second terminal 100-2 of FIGS. 5A through 5C and FIG. 10 may include the memory 110, the processor 120, the user interface 130, the communication interface 140, and the audio/video input unit 150 of the terminal 100 of FIG. 2 and may perform the same operation as that of the terminal 100 of FIG. 2.

Figure 5A:
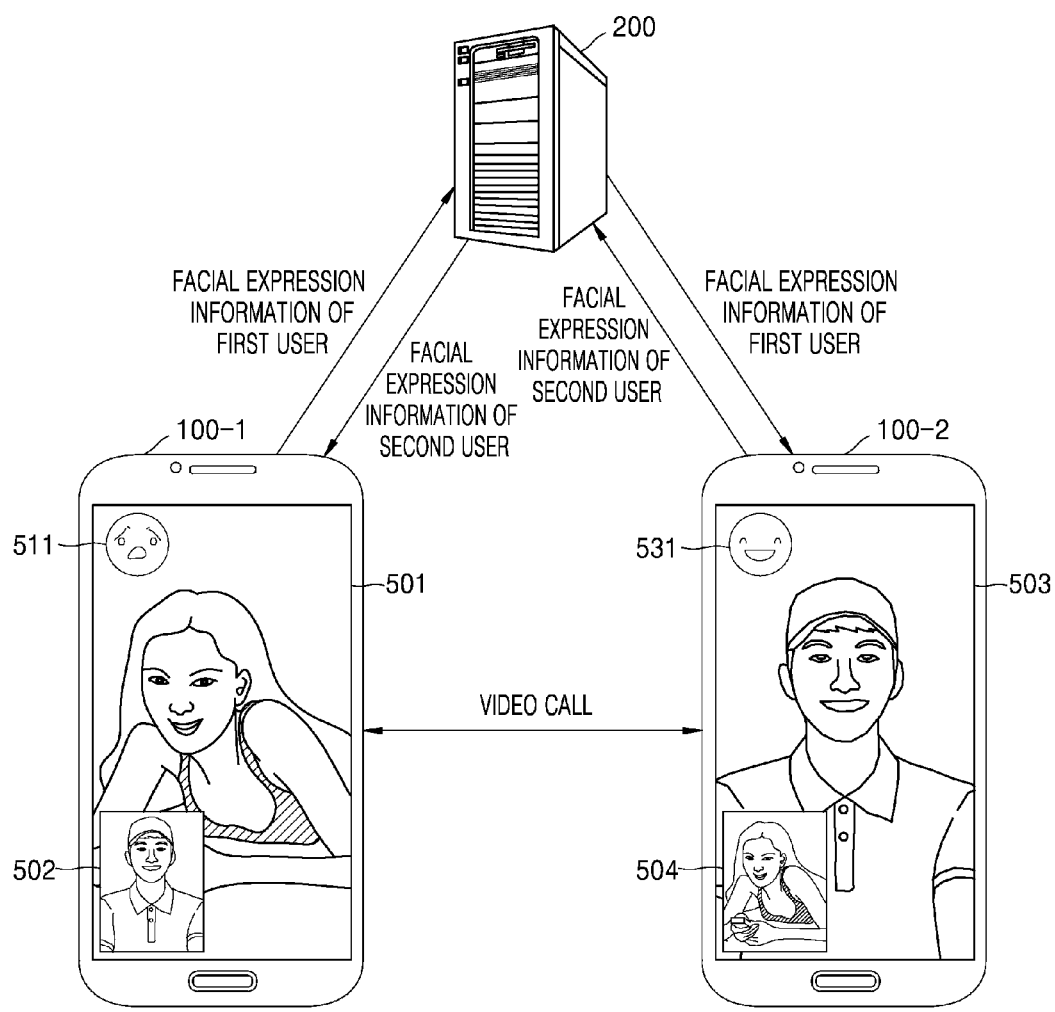
FIG. 5A is a diagram for describing a process by which a first terminal receives facial expression information of a second user of a second terminal from the server and provides emotion information corresponding to the facial expression information of the second user through an execution screen of the first terminal, according to an embodiment.
Figure 5B:
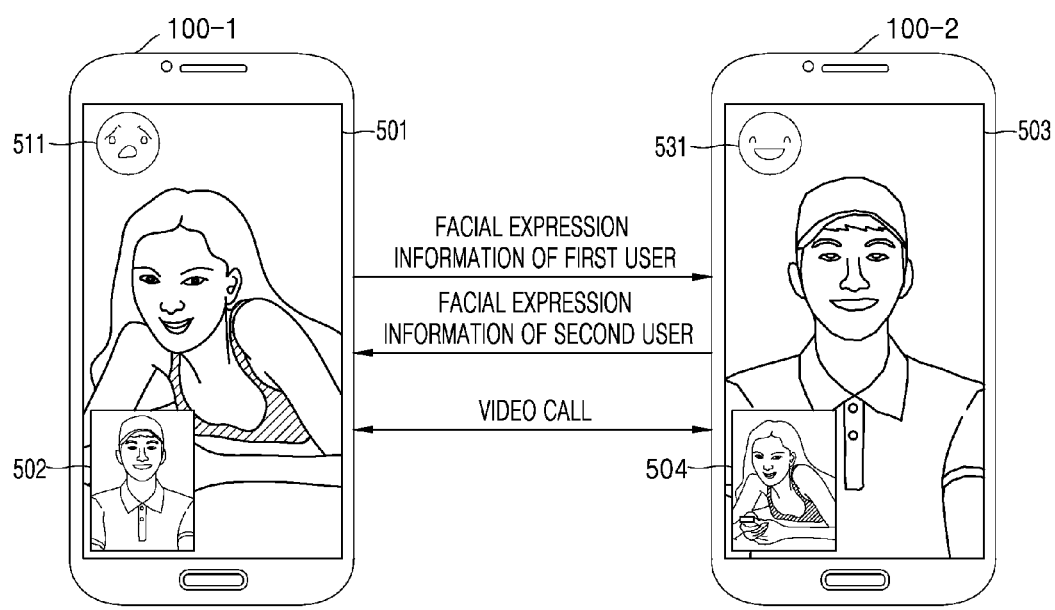
FIG. 5B is a diagram for describing a process by which the first terminal receives facial expression information of the second user of the second terminal from the second terminal and provides emotion information corresponding to the facial expression information of the second user through the execution screen of the first terminal, according to another embodiment.
Figure 5C:
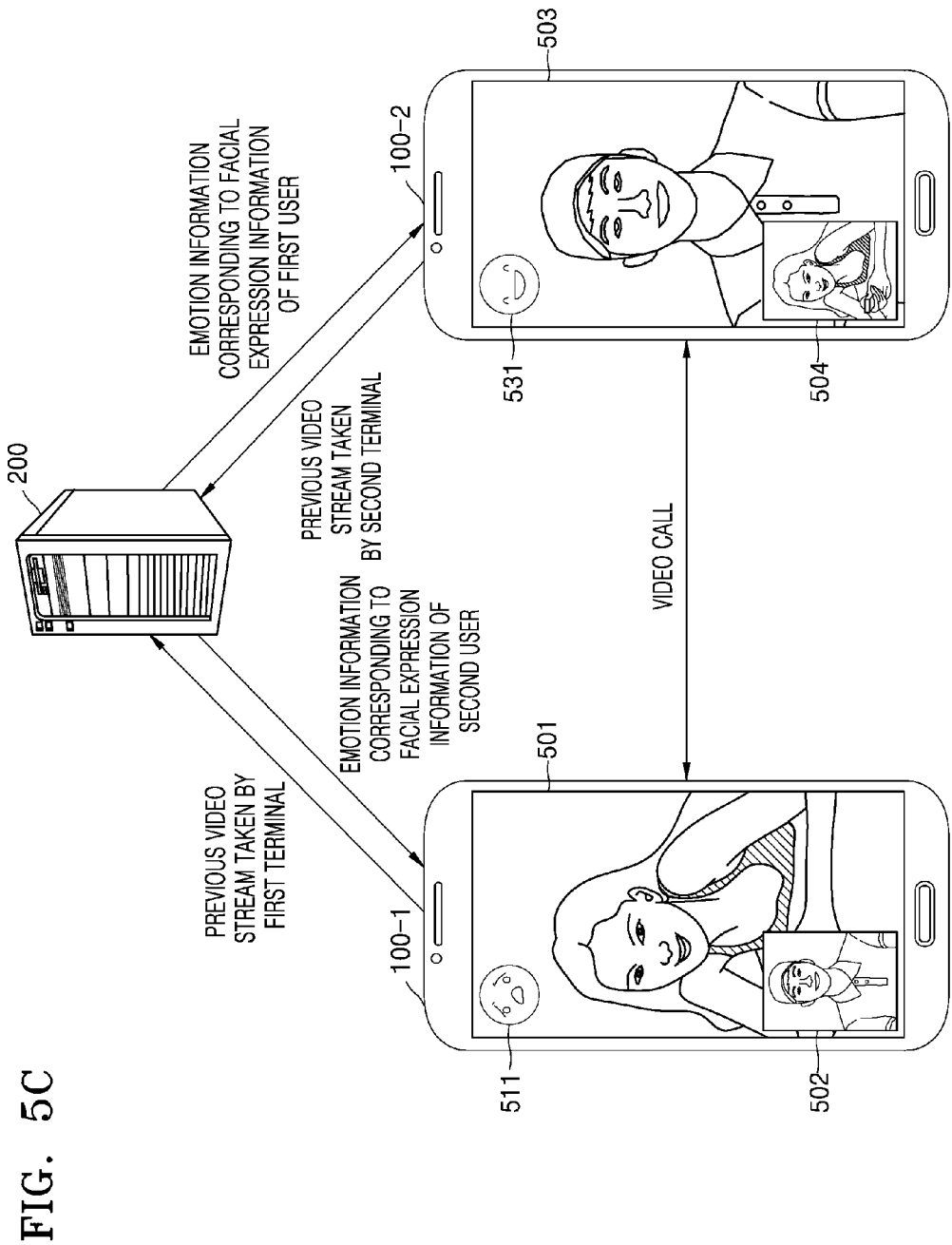
FIG. 5C is a diagram for describing a process by which, when a video call session between terminals is established, the server provides emotion information corresponding to facial expression information of a user who is the counterpart to each of the terminals, according to another embodiment.

Also, the server 200 of FIGS. 5A and 5C may include the memory 210, the processor 220, the storage 230, and the communication interface 240 of the server 200 of FIG. 3 and may perform the same operation as that of the server 200 of FIG. 3.

Various operations or applications performed by the first terminal 100-1, the second terminal 100-2, and the server 200 will now be described with reference to FIGS. 5A through 13. It will be understood by one of ordinary skill in the art that even when any of the memory 110, the processor 120, the user interface 130, the communication interface 140, and the audio/video input unit 150 of the first terminal 100-1 and the second terminal 100-2, and the memory 210, the processor 220, the storage 230, and the communication interface 240 of the server 200 is not specified, each operation or application that may be clearly understood and expected by one of ordinary skill in the art may be understood as typical implementation and the scope of the first terminal 100-1, the second terminal 100-2, and the server 200 is not limited by names or physical/logical structures of specific elements.

FIG. 5A is a diagram for describing a process by which the first terminal 100-1 receives facial expression information of a second user of the second terminal 100-2 from the server 200 and provides emotion information corresponding to the facial expression information of the second user through an execution screen of the first terminal 100-1, according to an embodiment.

As shown in FIG. 5A, the first terminal 100-1 of a first user may establish a video call session between the first terminal 100-1 of the first user and the second terminal 100-2 of the second user who is a counterpart of a video call through an application that provides a video call service (hereinafter, referred to as 'application'). When the video call session is established between the first terminal 100-1 and the second terminal 100-2, the first terminal 100-1 may display, in real time, a video 502 taken by the first user and a video 501 taken by the second user who is the counterpart of the video call. Likewise, the second terminal 100-2 may display, in real time, a video 503 taken by the first user who is the counterpart of the video call and a video 504 taken by the second user.

The first terminal 100-1 may prepare facial expression information of the second user accumulated in at least one video call session executed by the second terminal 100-2 before the video call session. In detail, as shown in FIG. 5A, the first terminal 100-1 may receive the facial expression information of the second user accumulated in at least one video call session executed by the second terminal 100-2 before the video call session, from the server 200 that provides the video call service (hereinafter, referred to as 'server 200'). Likewise, the second terminal 100-2 may receive facial expression information of the first user accumulated in at least one video call session executed by the first terminal 100-1 before the video call session, from the server 200.

The term "facial expression information" may refer to information used to determine a facial expression of a user. For example, "facial expression information" may include, but is not limited to, at least one of position information of facial feature points of a user, arrangement or distribution information of the facial feature points, and position change information of the facial feature points according to the passage of a predetermined time in the video call session.

The first terminal 100-1 may determine emotion information corresponding to the facial expression information of the second user based on the facial expression information of the second user. The term "emotion information" may refer to information indicating an emotional state of a user. The first terminal 100-1 may provide emotion information of the second user through the execution screen of the first terminal 100-1 according to the video call.

The first terminal 100-1 may determine at least one facial expression of the second user based on position information of facial feature points of the second user and position change information of the facial feature points according to the passage of a predetermined time, included in the facial expression information of the second user. For example, when feature points indicating both ends of the mouth from among feature points of the mouth of the second user are located over other feature points of the mouth, the first terminal 100-1 may determine that a facial expression of the second user is a smiling facial expression. Alternatively, when feature points of the eyebrows concentrate on the center or feature points indicating both ends of the eyebrows are located over other feature points of the eyebrows, the first terminal 100-1 may determine that a facial expression of the second user is an angry facial expression.

The first terminal 100-1 may determine the emotion information of the second user based on a frequency of each of at least one facial expression of the second user in at least one video call session (hereinafter, referred to as 'at least one previous image call session') before the video call session established between the first terminal 100-1 and the second terminal 100-2. For example, during at least one previous video call session (e.g., during the last five video call sessions), when a smiling facial expression occurs 18 times, an angry facial expression occurs 1 time, and a crying facial expression occurs 1 time, the first terminal 100-1 may determine that an emotion of the second user is happiness based on the frequency of each facial expression of the second user.

The first terminal 100-1 may generate an icon corresponding to a main emotional state of the second user based on the emotion information of the second user. The first terminal 100-1 may display the icon corresponding to the main emotional state of the second user or information of the icon along with the icon on the execution screen of the application of the first terminal 100-1.

As shown in FIG. 5A, the first terminal 100-1 may display an icon 511 corresponding to the main emotional state (e.g., depression) of the second user on the execution screen of the first terminal 100-1. Likewise, the second terminal 100-2 may display an icon 531 corresponding to a main emotional state of the first user (e.g., happiness) on an execution screen of the second terminal 100-2.

Also, alternatively, during at least one previous video call session (e.g., during the last five video call sessions), when a smiling facial expression occurs 18 times, an angry facial expression occurs 1 time, and a crying facial expression occurs 1 time, the first terminal 100-1 may determine that the main emotional state of the second user is happiness and may generate a first icon corresponding to happiness. The first terminal 100-1 may display the first icon (e.g., 511) corresponding to happiness or may display a phrase "happiness" along with the first icon on the execution screen of the application of the first terminal 100-1.

The first terminal 100-1 may classify emotional states of the second user according to categories based on the emotion information of the second user and may visualize a classification result as at least one of text, a graph, and a picture. The first terminal 100-1 may display a visualization result corresponding to the emotional states of the second user on the execution screen of the application of the first terminal 100-1. For example, during at least one previous video call session (e.g., during the last five video call sessions), when a smiling facial expression occurs 18 times, an angry facial expression occurs 1 time, and a crying facial expression occurs 1 time, the first terminal 100-1 may classify the emotional states of the second user as happiness (18 times), anger (1 time), and depression (1 time), and may display a classification result by using an icon corresponding to each category. The first terminal 100-1 may display the first icon corresponding to happiness, a second icon corresponding to anger, and a third icon corresponding to depression, and may also display frequency information of each icon.

Also, the first terminal 100-1 may display the emotional states of the second user by using cumulative ratio according to the classified categories. In the above example, the first terminal 100-1 may display 90% along with the first icon, may display 10% along with the second icon, and may display 10% along with the third icon.

The first terminal 100-1 may generate a list for recommending a predetermined item which the first user may provide to the second user, based on the emotion information of the second user. The first terminal 100-1 may display the list for recommending the predetermined item, on the execution screen of the application of the first terminal 100-1. For example, when the emotion information of the second user indicates depression, the first terminal 100-1 may generate a list such as "giving a movie ticket as a present", "giving a concert ticket as a present", and "giving a coffee exchange ticket as a present" and may display the list on the execution screen of the first terminal 100-1.

The first terminal 100-1 may determine background music to be reproduced during the video call or a background screen of an area where the first user is displayed, based on the emotion information of the second user. The first terminal 100-1 may share the background music or the background screen with the execution screen of the second terminal 100-2 through the execution screen of the first terminal 100-1. For example, when the emotion information of the second user indicates depression, the first terminal 100-1 may determine "rhythmic music" rather than "calm music" as background music for diversion of the second user. The first terminal 100-1 may output "rhythmic music" as the background music through the execution screen between the first terminal 100-1 and the second terminal 100-2. The first terminal 100-1 of the first user may share "rhythmic music" with the second terminal 100-2 of the second user.

The first terminal 100-1 may prepare information of at least one keyword used in a previous video call session executed by the second terminal 100-2. In detail, the first terminal 100-1 may receive the information of at least one keyword used in the previous video call session executed by the second terminal 100-2 from the server 200. Also, the first terminal 100-1 may receive the information of at least one keyword used in the previous call video session executed by the second terminal 100-2 from the second terminal 100-2. The term "keyword information" may include at least one of a keyword, facial expression information of a user corresponding to the keyword, and emotion information of the user corresponding to the keyword. The first terminal 100-1 may generate a keyword list including keywords usable in the video call between the first user and the second user, based on the information of at least one keyword and interest information of the first user stored in the first terminal 100-1. The first terminal 100-1 may display the keyword list generated through the execution screen of the first terminal 100-1. For example, the first terminal 100-1 may receive, from the server 200, information including "baseball" and "Korean Series", and indicating that the facial expression information of the second user corresponding to "baseball" is a smiling facial expression, as information of a keyword used in the previous video call session. The first terminal 100-1 may generate a keyword list including "baseball schedule" and "Korean Series baseball ticket booking", based on "sports" that is the interest information of the first user and information of the keyword, and may display the keyword list on the execution screen of the first terminal 100-1.

At least one video call session executed by the second terminal 100-2 before the video call session between the first terminal 100-1 and the second terminal 100-2 may be at least one video call session executed by the second terminal 100-2 a predetermined time before a time when the video call session between the first terminal 100-1 and the second terminal 100-2 is established, or at least one video call session executed by the second terminal 100-2 along with the first terminal 100-1 before the video call session between the first terminal 100-1 and the second terminal 100-2.

Also, the second terminal 100-2 may receive the facial expression information of the first user accumulated in at least one video call session executed by the first terminal 100-1 before the video call session between the second terminal 100-2 and the first terminal 100-1. The second terminal 100-2 may determine emotion information corresponding to the facial expression information of the first user, based on the facial expression information of the first user. The second terminal 100-2 may provide the emotion information of the first user through the execution screen of the second terminal 100-2 according to the video call.

A method by which the first terminal 100-1 determines emotion information corresponding to facial expression information of the second user and provides the emotion information, based on the facial expression information of the second user may also be applied to the second terminal 100-2.

FIG. 5B is a diagram for describing a process by which the first terminal 100-1 receives facial expression information of the second user of the second terminal 100-2 from the second terminal 100-2 and provides emotion information corresponding to the facial expression information of the second user through the execution screen of the first terminal 100-1, according to another embodiment.

As shown in FIG. 5B, the first terminal 100-1 of the first user may establish a video call session between the first terminal 100-1 and the second terminal 100-2 of the second user who is the counterpart of a video call through the application. When the video call session between the first terminal 100-1 and the second terminal 100-2 is established, the first terminal 100-1 may display, in real time, the video 501 taken by the second user who is the counterpart of the video call and the video 502 taken by the first user. Likewise, the second terminal 100-2 may display, in real time, the video 503 taken by the first user who is the counterpart of the video call and the video 504 taken by the second user.

The first terminal 100-1 may prepare facial expression information of the second user accumulated in at least one video call session executed by the second terminal 100-2 before the video call session. In detail, as shown in FIG. 5B, the first terminal 100-1 may receive the second facial expression information of the second user accumulated in at least one video call session executed by the second terminal 100-2 before the video call session from the second terminal 100-2. Likewise, the second terminal 100-2 may receive facial expression information of the first user accumulated in at least one video call session executed by the first terminal 100-1 before the video call session from the first terminal 100-1.

A method of FIG. 5A by which the first terminal 100-1 determines emotion information corresponding to the facial expression information of the second user and provides the emotion information, based on the facial expression information of the second user may also be applied to the first terminal 100-1 and the second terminal 100-2 of FIG. 5B.

FIG. 5C is a diagram for describing a process by which, when a video call session between terminals is established, the server 200 provides emotion information corresponding to facial expression information of a user who is the counterpart to each of the terminals, according to another embodiment.

The server 200 may receive a video stream taken in a video call session executed by each of a plurality of terminals, from each of the plurality of terminals. For example, the server 200 may receive a previous video stream of the first user from the first terminal 100-1. The server 200 may receive a previous video stream of the second user from the second terminal 100-2.

The server 200 may obtain facial expression information of a user of each of the plurality of terminals, based on facial feature points of the user included in each video stream. The server 200 may extract the facial feature points of the user included in the video stream by combining one or more of scale invariant feature transform (SIFT), histogram of oriented gradient (HOG), Haar feature, Ferns, local binary pattern (LBP), and modified census transform (MCT), or may extract the facial feature points by using another method. The server 200 may obtain at least one of position information of the facial feature points, arrangement or distribution information of the facial feature points, and position change information of the facial feature points according to the passage of a predetermined time in the video call session, based on the facial feature points.

The server 200 may determine at least one facial expression of the user corresponding to each of the plurality of terminals, based on the position information of the facial feature points of the user and the position change information of the facial feature points according to the passage of the predetermined time included in the facial expression information of the user corresponding to each of the plurality of terminals. The server 200 may determine an emotion state of the user corresponding to each of the plurality of terminals, based on a frequency of each of at least one facial expression of the user corresponding to each of the plurality of terminals. The server 200 may store the emotional state of the user corresponding to the each of the plurality of terminals in the storage 230.

The server 200 may check whether a video call session between the first terminal 100-1 of the first user and the second terminal 100-2 of the second user who is the counterpart of a video call is established. When the video call session between the first terminal 100-1 and the second terminal 100-2 is established, the first terminal 100-1 may display, in real time, the video 501 taken by the second user who is the counterpart of the video call and the video 502 taken by the first user. Likewise, the second terminal 100-2 may display, in real time, the video 503 taken by the first user who is the counterpart of the video call and the video 504 taken by the second user.

After it is checked that the video call session between the first terminal 100-1 and the second terminal 100-2 is established, the server 200 may transmit, to the first terminal 100-1, emotion information of the second user accumulated in at least one video call session executed by the second terminal 100-2 before the establishing of the video call session, stored in the storage 230.

The server 200 may generate an icon corresponding to a main emotional state of the second user based on the emotion information of the second user and may transmit the generated icon to the first terminal 100-1. As shown in FIG. 5C, the first terminal 100-1 may display the icon 511 corresponding to the main emotional state (e.g., depression) of the second user on the execution screen of the first terminal 100-1. Likewise, the second terminal 100-2 may display the icon 531 corresponding to a main emotional state (e.g., happiness) of the first user on the execution screen of the second terminal 100-2.

Also, the server 200 may classify emotional states of the second user based on the emotion information of the second user according to categories and may visualize a classification result as at least one of text, a graph, and a picture. The server 200 may transmit a visualization result to the first terminal 100-1. For example, the server 200 may transmit, to the first terminal 100-1, the visualization result obtained by displaying the emotional states of the second user by using cumulative ratio according to the classified categories.

The server 200 may generate a list for recommending a predetermined item which the first user may provide to the second user, based on the emotion information of the second user and may transmit the generated list to the first terminal 100-1.

The server 200 may determine background music to be reproduced during the video call between the first user and the second user or a background screen of an area where the first user is displayed, based on the emotion information of the second user, and may transmit the determined background music or background screen to the first terminal 100-1.

The server 200 may obtain information of at least one keyword used in the video call session executed by each of the plurality of terminals, based on a voice signal included in the received video stream, and may store the obtained information of at least one keyword in the storage 230. When the video call session between the first terminal 100-1 of the first user and the second terminal 100-2 of the second user is established, the server 200 may generate a keyword list usable during the video call between the first user and the second user, based on information of a keyword related to the second user. The server 200 may transmit the generated keyword list to the first terminal 100-1.

Likewise, after it is checked that the video call session between the first terminal 100-1 and the second terminal 100-2 is established, the server 200 may transmit, to the second terminal 100-2, emotion information of the first user accumulated in at least one video call session executed by the first terminal 100-1 before the establishing of the video call session, stored in the storage 230.

Also, a method by which the server 200 visualizes the emotion information indicating the emotional state of the second user based on the emotion information of the second user and transmits a visualization result to the first terminal 100-1 may also be applied to a method of visualizing emotion information indicating an emotional state of the first user based on the emotion information of the first user and transmitting a visualization result to the second terminal 100-2.

Figure 6:
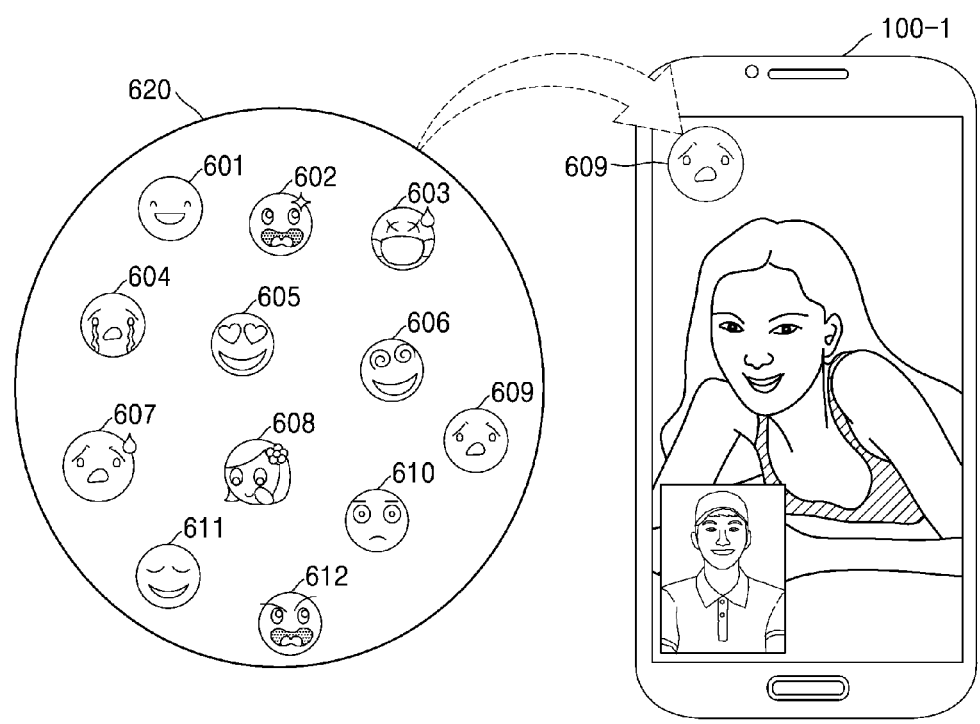
FIG. 6 is a diagram for describing a process by which the first terminal displays an icon corresponding to a main emotional state of the second user based on emotion information obtained from analysis of facial expression information of the second user, according to an embodiment.

FIG. 6 is a diagram for describing a process by which the first terminal 100-1 displays an icon corresponding to a main emotional state of the second user based on emotion information obtained from analysis of facial expression information of the second user, according to an embodiment.

The first terminal 100-1 may generate an icon corresponding to a main emotional state of the second user, based on emotion information of the second user. The first terminal 100-1 may display the icon corresponding to the main emotional state of the second user or information of the icon along with the icon, on an execution screen of an application of the first terminal 100-1.

Referring to FIG. 6, the first terminal 100-1 may determine the emotion information of the second user, based on facial expression information of the second user obtained from at least one video call session before a video call session between the first terminal 100-1 and the second terminal 100-2. Examples of emotion may include, but are not limited to, happiness, surprise, pain, sadness, crush, fluster, distress, shame, depression, embarrassment, comfort, and anger. The first terminal 100-1 may generate an icon corresponding to the emotion information of the second user and may display the generated icon on the execution screen of the first terminal 100-1. In detail, the first terminal 100-1 may generate at least one icon corresponding to the emotion information of the second user from among icons 620 indicating a plurality of emotions, based on the emotion information of the second user. The icons 620 indicating the plurality of emotions may include, but are not limited to, an icon 601 indicating happiness, an icon 602 indicating surprise, an icon 603 indicating pain, an icon 604 indicating sadness, an icon 605 indicating crush, an icon 606 indicating fluster, an icon 607 indicating distress, an icon 608 indicating shame, an icon 609 indicating depression, an icon 610 indicating embarrassment, an icon 611 indicating comfort, and an icon 612 indicating anger. For example, in at least one previous video call session, the second user may express emotions of happiness, surprise, pain, sadness, crush, fluster, distress, shame, depression, embarrassment, comfort, and anger. The first terminal 100-1 may determine that an emotion of the second user corresponding to depression having a highest frequency is a main emotion and may generate the icon 609 corresponding to the main emotion. The first terminal 100-1 may display the icon 609 indicating depression on the execution screen of the first terminal 100-1.

Figure 7:
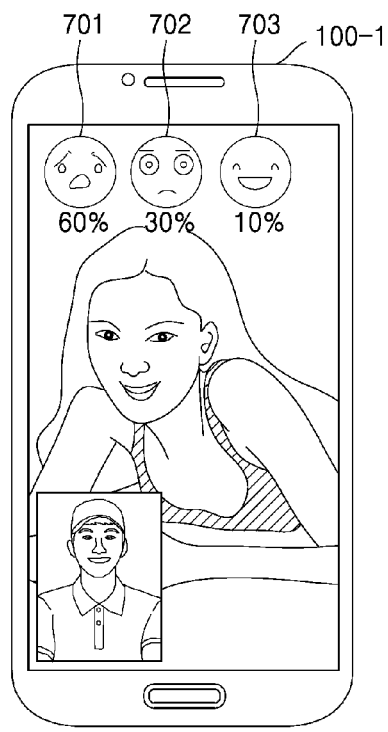
FIG. 7 is a diagram for describing a process by which the first terminal visualizes and displays an emotional state of the second user based on emotion information obtained from analysis of facial expression information of the second user, according to an embodiment.

FIG. 7 is a diagram for describing a process by which the first terminal 100-1 visualizes and displays an emotional state of the second user based on emotion information obtained from analysis of facial expression information of the second user, according to an embodiment.

The first terminal 100-1 may classify emotional states of the second user according to categories based on emotion information of the second user and may visualize a classification result as at least one of text, a graph, and a picture. The first terminal 100-1 may display a visualization result corresponding to the emotional states of the second user on an execution screen of the first terminal 100-1.

In detail, the first terminal 100-1 may determine at least one facial expression of the second user based on position information of facial feature points of the second user and position change information of the facial feature points according to the passage of a predetermined time. The first terminal 100-1 may determine the emotion information indicating the emotional states of the second user based on a frequency of the determined at least one facial expression. The first terminal 100-1 may classify similar emotion information in the determined emotion information into one category. For example, depression, anxiety, and frustration may be classified as depression, and embarrassment, surprise, and urgency may be classified as embarrassment, and happiness, satisfaction, and contentment may be classified as happiness. The first terminal 100-1 may generate icons corresponding to classified categories and may display the emotional states of the second user according to the icons by using cumulative percentages.

As shown in FIG. 7, the first terminal 100-1 may classify the emotional states of the second user as depression, embarrassment, and happiness based on the emotion information of the second user and may generate an icon 701 indicating depression, an icon 702 indicating embarrassment, and an icon 703 indicating happiness. The first terminal 100-1 may display the emotional states of the second user corresponding to depression, embarrassment, and happiness by using cumulative ratio and may more efficiently provide the emotional states of the second user.

Figure 8:
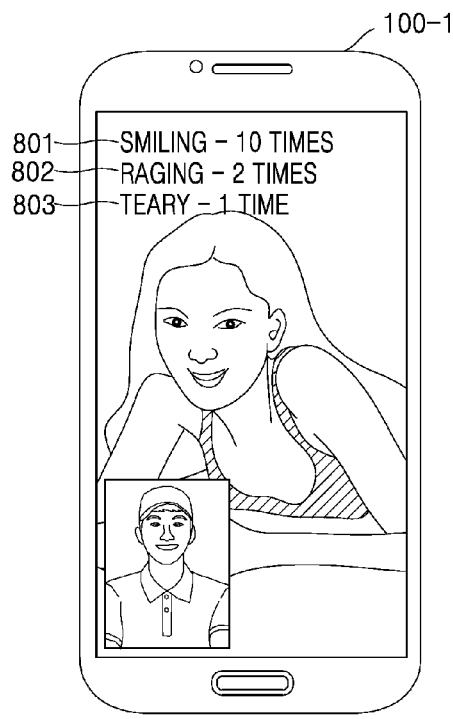
FIG. 8 is a diagram for describing a process by which the first terminal displays facial expression information of the second user by using accumulation information, according to an embodiment.

FIG. 8 is a diagram for describing a process by which the first terminal 100-1 displays facial expression information of the second user by using accumulation information, according to an embodiment.

Referring to FIG. 8, the first terminal 100-1 may determine a smiling facial expression, a raging facial expression, and a teary facial expression of the second user based on position information of facial feature points of the second user and position change information of the facial feature points according to the passage of a predetermined time in the last five video call sessions before a video call session established between the first terminal 100-1 and the second terminal 100-2. The first terminal 100-1 may display determined facial expression information along with a frequency. As shown in FIG. 8, the first terminal 100-1 may display a text phrase "smiling-10 times 801, raging-2 times 802, teary-1 time 803" on an execution screen of the first terminal 100-1.

Figure 9:
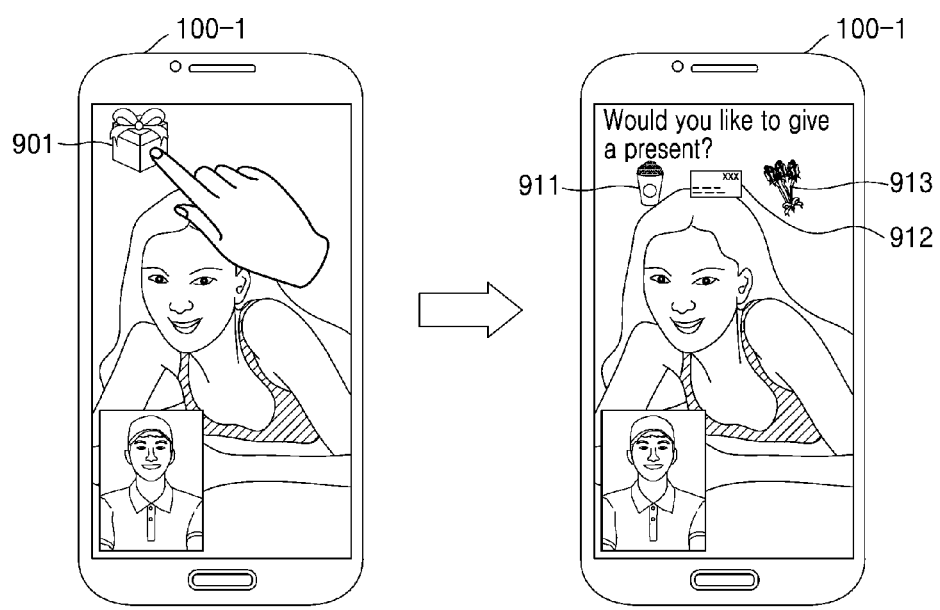
FIG. 9 is a diagram for describing a process by which the first terminal displays a list for recommending a predetermined item which the first user may provide to the second user based on an emotional state of the second user, according to an embodiment.

FIG. 9 is a diagram for describing a process by which the first terminal 100-1 displays a list for recommending a predetermined item which the first user may provide to the second user based on an emotional state of the second user, according to an embodiment.

As shown in FIG. 9, the first terminal 100-1 may display an icon 901 corresponding to a "present" on an execution screen of the first terminal 100-1. When the first user of the first terminal 100-1 touches the icon 901, the first terminal 100-1 may display a list for recommending a predetermined item which the first user may provide to the second user based on emotion information of the second user. The list for recommending the predetermined item is a list of an item determined based on the emotion information of the second user. When the emotion information of the second user indicates depression, the first terminal 100-1 may determine a "coffee giftcon 911", a "movie ticket 912", and a "bouquet 913" for diversion of the second user as items of the list by enabling the first user to give a present to the second user. When the first user selects an item in the list displayed on the screen, the first terminal 100-1 may transmit the selected item to the second terminal 100-2.

Figure 10:
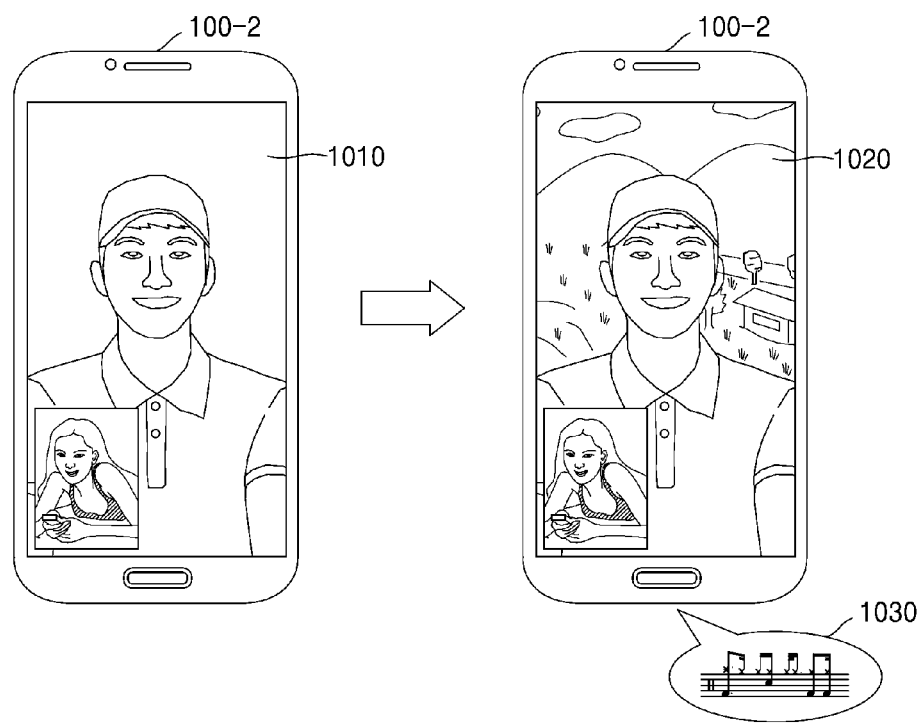
FIG. 10 is a diagram for describing a process by which the first terminal shares background music or a background screen during a video call based on an emotional state of the second user, according to an embodiment.

FIG. 10 is a diagram for describing a process by which the first terminal 100-1 shares background music or a background screen during a video call based on an emotional state of the second user, according to an embodiment.

As shown in FIG. 10, when emotion information of the second user indicates depression, the first terminal 100-1 may determine that background music to be reproduced during a video call is "rhythmic music" based on the emotion information of the second user and may share the "rhythmic music" with the second terminal 100-2 of the second user through an execution screen of an application. Also, the first terminal 100-1 may determine that a background screen displayed during the video call is a "comfortable background" based on the emotion information of the second user and may share the "comfortable background" with the second terminal 100-2 of the second user through the execution screen of the application.

Figure 11:
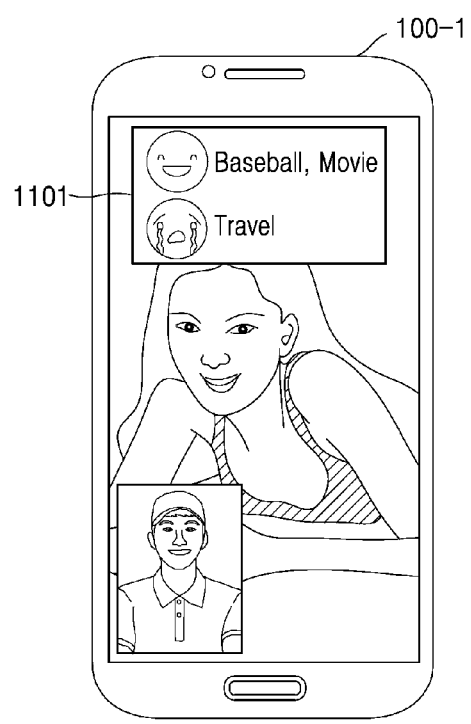
FIG. 11 is a diagram for describing a process by which the first terminal displays a keyword list usable in a video call between the first terminal of the first user and the second terminal of the second user based on a keyword used in a previous video call session of the second terminal, according to an embodiment.

FIG. 11 is a diagram for describing a process by which the first terminal 100-1 displays a keyword list usable in a video call between the first terminal 100-1 of the first user and the second terminal 100-2 of the second user based on a keyword used in a previous video call session of the second terminal 100-2, according to an embodiment.

The first terminal 100-1 may receive information of at least one keyword used in a previous video call session executed by the second terminal 100-2 from the server 200. Alternatively, the first terminal 100-1 may receive the information of at least one keyword used in the previous video call session executed by the second terminal 100-2 from the second terminal 100-2. Keyword information may include at least one of a keyword, facial expression information of the second user corresponding to the keyword, and emotion information of the second user corresponding to the keyword.

The first terminal 100-1 may generate a keyword list including a keyword usable in a video call between the first user and the second user based on the information of at least one keyword and may display the generated keyword list on an execution screen of the first terminal 100-1. For example, the first terminal 100-1 may display a keyword list including only a keyword used in the previous video call session executed by the second terminal 100-2 on the execution screen of the first terminal 100-1.

Also, the first terminal 100-1 may generate the keyword list including the keyword usable in the video call between the first user and the second user based on the information of at least one keyword and interest information of the first user and may display the generated keyword on the execution screen of the first terminal 100-1. For example, the first terminal 100-1 may extract a keyword related to the interest information of the first user stored in the first terminal 100-1 from among keywords used in the previous video call executed by the second terminal 100-2, and may display a keyword list including only the extracted keyword on the execution screen of the first terminal 100-1.

Also, the first terminal 100-1 may display a keyword list including at least one keyword and facial expression information or emotion information of the second user for the at least one keyword on the execution screen of the first terminal 100-1. For example, when the second user has a first facial expression a predetermined number of times or more when a first keyword appears and has a second facial expression a predetermined number of times or more when a second keyword appears in a previous video call session, the first terminal 100-1 may generate a keyword list by pairing the first keyword with an icon corresponding to the first facial expression and pairing the second keyword with an icon corresponding to the second facial expression. As shown in FIG. 11, when the second user has a smiling facial expression 7 times or more when baseball and a movie appear and has a teary facial expression 7 times or more when a travel appears in a previous video call session of the second user, the first terminal 100-1 may generate a keyword list 1101 by pairing the baseball and the movie with an icon corresponding to the smiling facial expression and pairing the travel with an icon corresponding to the teary facial expression. The first terminal 100-1 may display the keyword list 1101 on the execution screen of the first terminal 100-1.

Figure 12:
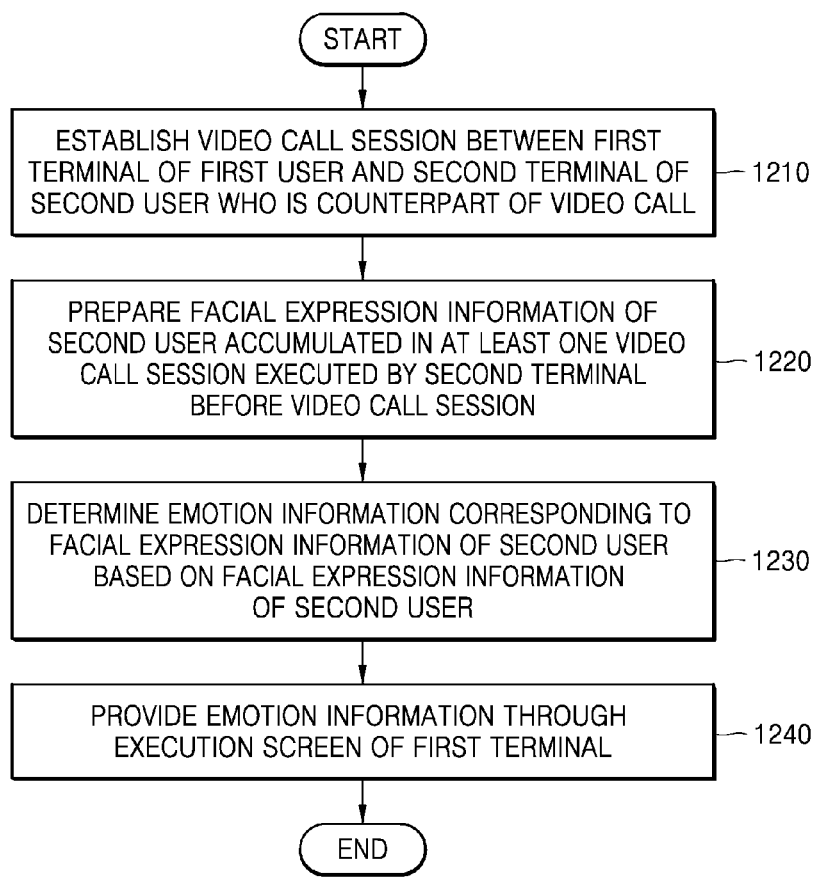
FIG. 12 is a flowchart for describing a method by which the first terminal provides a video call service by providing emotion information corresponding to facial expression information of the second terminal to an execution screen of the first terminal, according to an embodiment.

FIG. 12 is a flowchart of a method by which the first terminal 100-1 provides a video call service by providing emotion information corresponding to facial expression information of the second user to an execution screen of the first terminal 100-1, according to an embodiment.

In operation 1210, the first terminal 100-1 of the first user may establish a video call session with the second terminal 100-2 of the second user.

In operation 1220, the first terminal 100-1 may prepare facial expression information of the second user accumulated in at least one video call session executed by the second terminal 100-2 before the video call session.

For example, the first terminal 100-1 may receive the facial expression information of the second user accumulated in at least one video call session executed by the second terminal 100-2 before the video call session, from the server 200 that provides a video call service.

Alternatively, the first terminal 100-1 may receive the facial expression information of the second user accumulated in at least one video call session executed by the second terminal 100-2 before the video call session from the second terminal 100-2.

In operation 1230, the first terminal 100-1 may determine emotion information corresponding to the facial expression information of the second user based on the facial expression information of the second user. In detail, the first terminal 100-1 may determine at least one facial expression of the second user based on position information of facial feature points of the second user and position change information of the facial feature points included in the facial expression information of the second user. The first terminal 100-1 may determine the emotion information of the second user based on a frequency of each of at least one facial expression of the second user, in at least one video call session before the video call session established between the first terminal 100-1 and the second terminal 100-2.

In operation 1240, the first terminal 100-1 may provide the determined emotion information through an execution screen of the first terminal 100-1 according to a video call.

For example, the first terminal 100-1 may generate an icon corresponding to a main emotional state of the second user based on the emotion information of the second user. The first terminal 100-1 may display the icon corresponding to the main emotional state of the second user or information of the icon along with the icon on an execution screen of an application of the first terminal 100-1.

Alternatively, the first terminal 100-1 may classify emotional states of the second user according to categories based on the emotion information of the second user and may visualize a classification result as at least one of text, a graph, and a picture. The first terminal 100-1 may display a visualization result corresponding to the emotional states of the second user on the execution screen of the application of the first terminal 100-1. Also, the first terminal 100-1 may display the emotional states of the second user according to the classified categories by using cumulative ratio.

Alternatively, the first terminal 100-1 may generate a list for recommending a predetermined item which the first user may provide to the second user based on the emotion information of the second user. The first terminal 100-1 may display the list for recommending the predetermined item on the execution screen of the application of the first terminal 100-1.

For example, the first terminal 100-1 may determine background music to be reproduced during the video call or a background screen of an area where the first user is displayed based on the emotion information of the second user. The first terminal 100-1 may share the background music or the background screen with an execution screen of the second terminal 100-2 through the execution screen of the first terminal 100-1.

Alternatively, the first terminal 100-1 may receive information of at least one keyword used in a previous video call session executed by the second terminal 100-2 from the server 200 or the second terminal 100-2. The first terminal 100-1 may generate a keyword list including a keyword usable in the video call between the first user and the second user based on the information of at least one keyword and interest information of the first user stored in the first terminal 100-1. The first terminal 100-1 may display the generated keyword list through the execution screen of the first terminal 100-1.

Embodiments of a method of providing a video call service may be provided as applications or computer programs stored in a computer-readable storage medium so that the first terminal 100-1 that provides the video call service performs a method of providing emotion information corresponding to facial expression information of the second user.

Figure 13:
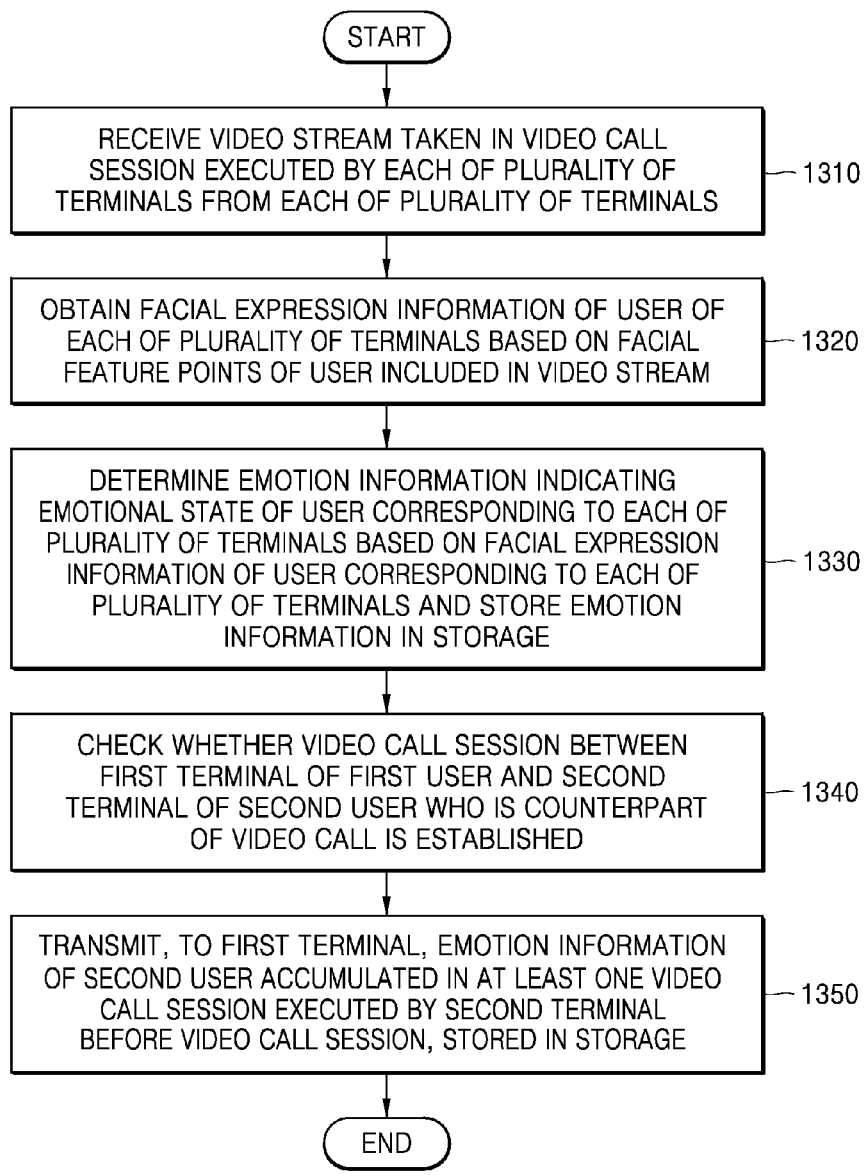
FIG. 13 is a flowchart for describing a method by which, when a video call session between the first terminal of the first user and the second terminal of the second user is established, the server provides a video call service by transmitting emotion information corresponding to facial expression information of the second user to the first terminal, according to an embodiment.

FIG. 13 is a flowchart for describing a method by which, when a video call session between the first terminal 100-1 of the first user and the second terminal 100-2 of the second user is established, the server 200 provides a video call service by transmitting emotion information corresponding to facial expression information of the second user to the first terminal 100-1, according to an embodiment.

In operation 1310, the server 200 may receive a video stream taken in a video call session executed by each of a plurality of terminals from each of the plurality of terminals.

In operation 1320, the server 200 may obtain facial expression information of a user of each of the plurality of terminals based on facial feature points of the user included in the video stream.

In operation 1330, the server 200 may determine emotion information indicating an emotional state of the user corresponding to each of the plurality of terminals based on the facial expression information of the user corresponding to each of the plurality of terminals. The server 200 may store the emotion information of the user corresponding to each of the plurality of terminals in the storage 230.

In operation 1340, the server 200 may check whether a video call session between the first terminal 100-1 of the first user and the second terminal 100-2 of the second user who is the counterpart of a video call is established.

In operation 1350, after it is checked that the video call session between the first terminal 100-1 and the second terminal 100-2 is established, the server 200 may transmit, to the first terminal 100-1, emotion information of the second user accumulated in at least one video call session executed by the second terminal 100-2 before the establishing of the video call session, stored in the storage 230. The description that the server 200 transmits the emotion information of the second user to the first terminal 100-1 has already been made with reference to FIG. 5C, and thus a repeated explanation will not be given.

Embodiments of a method of providing a video call service may be provided as applications or computer programs stored in a computer-readable storage medium so that the server 200 that provides the video call service performs a method of providing emotion information corresponding to facial expression information of each counterpart to the first terminal 100-1 of the first user and the second terminal 100-2 of the second user between which a video call session is established While the present disclosure has been particularly shown and described with reference to embodiments thereof, it will be apparent to one of ordinary skill in the art that various modifications and variations may be made in the present disclosure without departing from the spirit or scope of the disclosure. For example, suitable results may be achieved even when the described techniques are performed in a different order, and/or even when components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An application stored in a non-transitory computer-readable storage medium for a first terminal to perform a method of providing a video call service, the method comprising:
   establishing a video call session between the first terminal of a first user and a second terminal of a second user;
   preparing facial expression information of the second user accumulated in at least one previous video call session executed by the second terminal before the video call session;
   determining emotion information of the second user accumulated during the at least one previous video call session, based on the facial expression information of the second user; and
   providing the determined emotion information through an execution screen of the first terminal.

2. The application of claim 1, wherein the determining of the emotion information corresponding to the facial expression information of the second user based on the facial expression information of the second user comprises:
   determining at least one facial expression of the second user based on position information of facial feature points of the second user and position change information of the facial feature points according to passage of a predetermined time included in the facial expression information of the second user; and
   determining the emotion information indicating an emotional state of the second user based on a frequency of each of the at least one facial expression of the second user in the at least one video call session.

3. The application of claim 1, wherein the providing of the determined emotion information through the execution screen of the first terminal comprises:
   generating an icon corresponding to a main emotional state of the second user based on the emotion information; and
   displaying the icon corresponding to the main emotional state of the second user or information of the icon along with the icon, on the execution screen of the first terminal.

4. The application of claim 1, wherein the providing of the determined emotion information through the execution screen of the first terminal comprises:
   classifying emotional states of the second user according to categories based on the emotion information and
   visualizing a classification result as at least one of text, a graph, and a picture; and
   displaying a visualization result corresponding to the emotional states of the second user on the execution screen of the first terminal.

5. The application of claim 4, wherein the displaying of the visualization result corresponding to the emotional states of the second user on the execution screen of the first terminal comprises displaying the emotional states of the second user according to the classified categories by using cumulative ratio.

6. The application of claim 1, wherein the providing of the determined emotion information through the execution screen of the first terminal comprises:
   generating a list for recommending a predetermined item which the first user is able to provide to the second user based on the emotion information; and
   displaying the list for recommending the predetermined item on the execution screen of the first terminal.

7. The application of claim 1, wherein the providing of the determined emotion information through the execution screen of the first terminal comprises:
   determining background music to be reproduced during the video call session or a background screen of an area where the first user is displayed, based on the emotion information; and
   sharing the background music or background screen determined through the execution screen of the first terminal according to a video call with an execution screen of the second terminal.

8. The application of claim 1, further comprising:
   preparing information of at least one keyword used in the at least one video call session executed by the second terminal before the video call session; and
   generating a keyword list based on the information of the at least one keyword and interest information of the first user stored in the first terminal and displaying the generated keyword list through the execution screen of the terminal.

9. The application of claim 8, wherein the information of the at least one keyword comprises at least one of the at least one keyword, the facial expression information of the second user corresponding to the at least one keyword, and the emotion information of the second user corresponding to the at least one keyword.

10. The application of claim 1, wherein the preparing of the facial expression information of the second user accumulated in the at least one video call session executed by the second terminal before the video call session comprises receiving the facial expression information of the second user accumulated in the at least one video call session executed by the second terminal before the video call session, from the second terminal or a server that provides the video call service.

11. The application of claim 1, wherein the at least one video call session executed by the second terminal before the video call session is at least one video call session executed a predetermined time before a time when the video call session is established or at least one video call session executed by the second terminal along with the first terminal before the video call session.

12. A server for providing a video call service, the server comprising:
   a communication interface configured to communicate with a plurality of terminals that support a video call;
   a storage;
   a processor; and a memory configured to store instructions executable by the processor, wherein the processor is configured to execute the instructions for receiving a video stream taken in a first video call session executed by each of the plurality of terminals, from each of the plurality of terminals, obtaining facial expression information of a user of each of the plurality of terminals based on facial feature points of the user included in the received video stream, determining emotion information indicating an emotional state of the user corresponding to each of the plurality of terminals based on the facial expression information of the user corresponding to each of the plurality of terminals and storing the emotion information in the storage, checking whether a second video call session is established between a first terminal of a first user and a second terminal of a second user, and transmitting, to the first terminal, emotion information of the second user accumulated in the first video call session executed by the second terminal before the establishing of the second video call session, stored in the storage.

13. The server of claim 12, wherein the processor is further configured to execute the instructions for, classifying emotional states of the second user according to categories based on the emotion information of the second user and visualizing a classification result as at least one of text, a graph, and a picture, and transmitting, to the first terminal, a visualization result corresponding to the emotional states of the second user.

14. The server of claim 12, wherein the processor is further configured to execute the instructions for, obtaining information of at least one keyword used in the video call session executed by each of the plurality of terminals based on a voice signal included in the received video stream and storing the information of the at least one keyword in the storage, generating a keyword list used in a video call between the first user and the second user based on information of a keyword related to the second user when the video call session between the first terminal of the first user and the second terminal of the second user is established, and transmitting the generated keyword list to the first terminal.

15. A non-transitory computer-readable storage medium storing instructions executable by a processor, the non-transitory computer-readable storage medium comprising:

instructions for establishing a video call session between a first terminal of a first user and a second terminal of a second user;

instructions for preparing facial expression information of the second user accumulated in at least one previous video call session executed by the second terminal before the video call session;

instructions for determining emotion information accumulated during the at least one previous video call session of the second user, based on the facial expression information of the second user; and instructions for providing the determined emotion information through an execution screen of the first terminal.

* * * * *